Aug. 20, 1935.   G. M. BARNES   2,011,565
SUSPENSION FOR VEHICLES
Filed Feb. 28, 1934
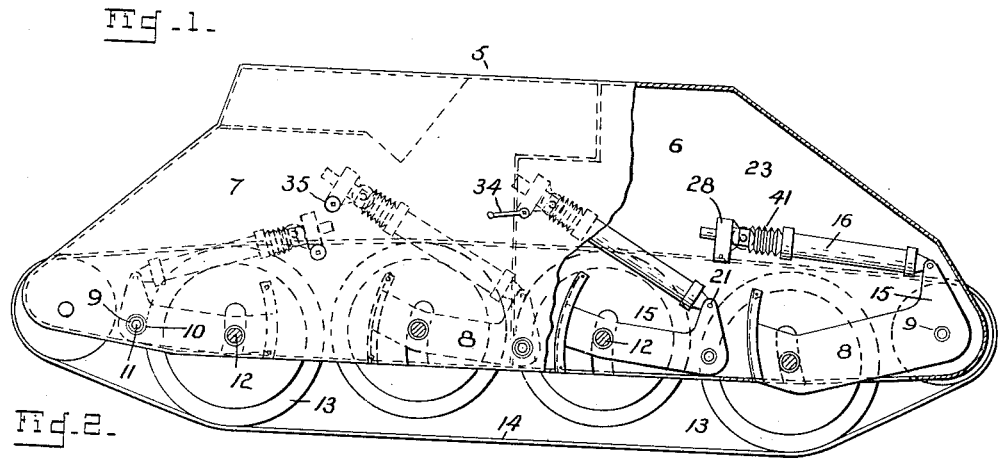
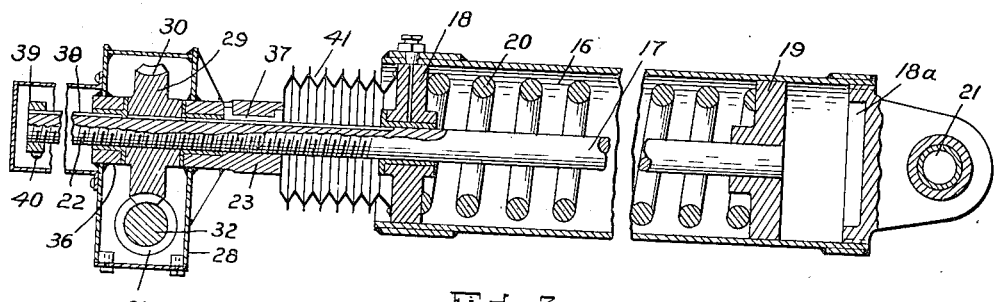
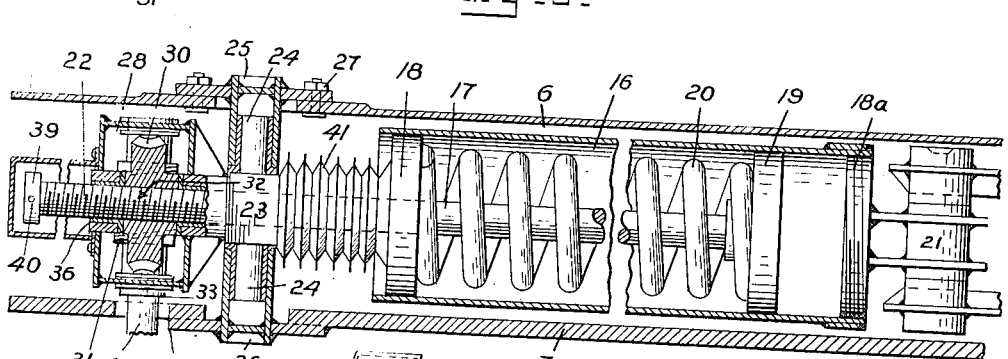
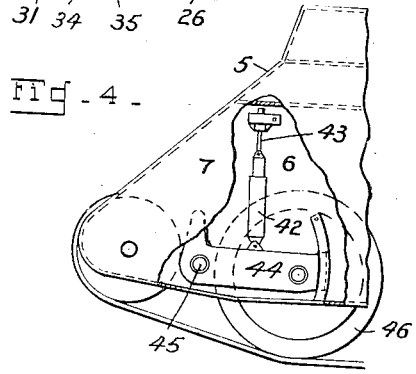
Inventor
Gladeon M. Barnes
By W. N. Roach
Attorney Patented Aug. 20, 1935

2,011,565

UNITED STATES PATENT OFFICE 2,011,565

SUSPENSION FOR VEHICLES

Gladeon M. Barnes, United States Army, Hastings, Mich.

Application February 28, 1934, Serial No. 713,357

4 Claims. (Cl. 180—9.1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a suspension for vehicles.

In heavy vehicles of the track-laying type it has been customary to place each of the wheels on one end of a lever which is fulcrumed on the body of the vehicle and acts against a resilient suspension mechanism. In traveling on good roads the track is removed and the intermediate levers are rotated so that their wheels are clear of the road.

The purpose of this invention is to provide a wheel mounting of the foregoing type in which the tension of a suspension spring may be varied and in which the spring may be inoperated when relatively movable elements of the mechanism are immovably associated for directly moving the lever.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a view in side elevation with parts broken away of a vehicle equipped with the improved suspension units.

Fig. 2 is a vertical longitudinal sectional view of a cylinder and piston suspension unit.

Fig. 3 is a horizontal sectional view thereof.

Fig. 4 is a modification showing the cylinder and piston in a vertical position.

Referring to the drawing by characters of reference, there is shown a vehicle including a body 5 having on each side an inner hull 6 and an outer hull 7 spaced therefrom. A series of levers having a long arm 8 disposed between the hulls are similar in construction and mounting and will be but briefly described as they form the subject of a separate application. The arm 8 is conveniently formed of welded plates and is provided adjacent one of its ends with a pair of hollow trunnions 9—9 fitting in bearing sleeves 10—10 in the hulls. A shaft 11 carried by the body extends through the hollow trunnions and forms an additional support therefor.

A spindle 12 in the free end of the arm carries a wheel 13 which is adapted to run on the ground or on a self-laying track generally indicated at 14.

Each lever includes a short upstanding arm 15 which is associated with a suspension unit disposed between the hulls 6 and 7. The suspension unit comprises a cylinder 16 a piston rod 17 passing through one end 18 of the cylinder, a piston head 19 and a helical spring 20 confined between the head 19 and end 18. The other end 18a of the cylinder is pivotally connected to the arm 15 by a pin 21.

The outer threaded portion 22 of the piston rod passes through an aperture in a block 23 which is formed with trunnions 24—24 mounted in bearing sleeves 25 and 26 respectively secured to the inner hull 6 and outer hull 7 as by the bolts 27. The block 23 includes a casing 28 adapted to house a nut 29 on the threaded portion of the piston rod. The nut is integral with a worm wheel 30 which meshes with a worm 31 on a shaft 32 journaled in the casing 28. The outer end 33 of the shaft is adapted to receive a detachable actuating tool 34 which is applied through an aperture 35 in the outer hull 7.

The casing 28 carries a bearing 36 which cooperates with one end of the block 23 to confine the nut. A key 37 carried by the block 23 enters a key-way 38 in the portion 22 of the piston rod. A cap 39 secured by a pin 40 on the outer end of the piston rod is engageable with the bearing 36 and the end of the casing 28 to limit movement of the piston rod. A bellows 41 secured to the block 23 and the end 18 of the cylinder encloses and protects the piston rod.

Upon rotation of the nut 29, the piston rod which is held against rotation by the key 37 is constrained to axial displacement. The piston rod may be moved until the head 19 is brought up against the end 18a of the cylinder. The piston and cylinder now form a rigid unit which is connected to the lever 8—15 and upon further rotation of the nut 29 they are axially moved, thereby rocking the lever about its fulcrum and raising the wheel 13 off of the ground as shown in the intermediate groups in Fig. 1. In traveling on good roads it may be desired to employ only the end wheels 13. In traveling on rough roads or cross-country all of the wheels and the track 14 are preferably employed. The arrangement also permits any wheel to be raised for the purpose of changing tires.

Upon rotating the nut 29 to withdraw the piston rod from the cylinder the spring 20 is brought into operation to resiliently support the body of the vehicle on the lever. The spring tension can be varied at will and the body of the vehicle can be raised or lowered as desired.

The threads on the nut 29 and the piston on the portion 22 of the rod and the teeth on the worm 31 and worm wheel 30 are self locking so that the piston rod is locked in position of adjustment.

In the modification shown in Fig. 4 the cylinder 42 and piston rod 43 are in a vertical position and the cylinder is connected to a lever 44 between its fulcrum 45 and wheel 46. The resilient supporting element may consist of air or, and, oil under pressure or it may also include a spring as shown in Patent No. 1,824,086 of September 22, 1931.

I claim:

1. In a vehicle, a body, a lever fulcrumed on the body, a wheel on one end of the lever, a cylinder pivotally attached to the other end of the lever, a piston rod passing through an end of the cylinder and having an outer threaded portion, a piston head within the cylinder, a spring confined between the piston head and an end of the cylinder, a block trunnioned in the body and having an aperture through which the threaded portion of the piston is passed, a key carried by the block and holding the piston rod against rotation, a casing on the block, a nut threaded on the piston rod and housed in the casing, a worm wheel on said nut, and a worm meshing with the worm wheel.

2. In a vehicle, a body, a lever fulcrumed on the body, a wheel on one end of the lever, a cylinder pivotally attached to the other end of the lever, a piston working in the cylinder and having an outer threaded portion, a yielding supporting element between the cylinder and piston, a block trunnioned in the body and slidably mounting the threaded portion of the piston, means for holding the piston against rotation, a casing on the block, a nut threaded on the piston and housed in the casing, a worm wheel on said nut and a worm meshing with the worm wheel.

3. In a vehicle, a body, a lever fulcrumed on the body, a wheel on one end of the lever, a cylinder pivotally attached to the other end of the lever, a piston working in the cylinder and having an outer threaded portion, a yielding supporting element between the cylinder and piston, a block trunnioned in the body and slidably mounting the threaded portion of the piston, means for holding the piston against rotation, a nut threaded on the piston, a worm wheel on said nut and a worm meshing with the worm wheel.

4. In a vehicle, a body, a lever fulcrumed on the body, a wheel on the lever, a cylinder pivotally attached to the other end of the lever, a piston working in the cylinder and having an outer threaded portion, a yielding supporting element between the cylinder and piston, means for pivotally mounting the piston on the body, and means for axially displacing the piston into direct contact with the cylinder whereby to rotate the lever.

GLADEON M. BARNES.